(12) United States Patent
Lee et al.

(10) Patent No.: US 7,972,513 B2
(45) Date of Patent: Jul. 5, 2011

(54) PROCESS FOR TREATING NITROGENOUS WASTEWATER WITH SIMULTANEOUS AUTOTROPHIC DENITRIFICATION, HETERTROPHIC DENITRIFICATION AND COD REMOVAL

(75) Inventors: Der-Ming Lee, Taipei (TW); Ming-Kuei Chiang, Taipei (TW); Chin-Te Chen, Taipei (TW); Keng-Chuan Sung, Taipei (TW); Jih-Gaw Lin, Hsinchu (TW); Chih-Cheng Wang, Kaohsiung County (TW)

(73) Assignees: Leaderman & Associates Co., Ltd. (TW); National Chiao Tung University (TW)

( * ) Notice: Subject to any disclaimer, the term of this patent is extended or adjusted under 35 U.S.C. 154(b) by 0 days.

(21) Appl. No.: 12/588,273

(22) Filed: Oct. 9, 2009

(65) Prior Publication Data

US 2011/0084022 A1    Apr. 14, 2011

(51) Int. Cl.
   *C02F 3/30* (2006.01)
(52) U.S. Cl. ........................... 210/630; 210/903
(58) Field of Classification Search .................. 210/605, 210/630, 903
   See application file for complete search history.

(56) References Cited

U.S. PATENT DOCUMENTS

| 5,078,884 A | 1/1992 | Mulder |
| 2008/0245730 A1 | 10/2008 | Tokutomi |
| 2010/0219125 A1* | 9/2010 | Northrop et al. .............. 210/605 |

FOREIGN PATENT DOCUMENTS

| JP | 2004097974 A | 4/2004 |
| JP | 2006055739 A | 3/2006 |

OTHER PUBLICATIONS

Mike S. M. Jetten, Svein J. Horn, and Mark C. M. van Loosdrecht (1997) Towards a More Sustainable Municipal Wastewater Treatment System. Wai. Sci. Tech. vol. 35, No. 9, . . . .

K.A. Third, A. Olav Sliekers, J.G. Kuenen, and M.S.M. Jetten (2001) The Canon System (Completely Autotrophic Nitrogen-removal Over Nitrite) Under Ammonium Limitation . . . .

\* cited by examiner

*Primary Examiner* — Fred Prince
(74) *Attorney, Agent, or Firm* — Bacon & Thomas, PLLC

(57) ABSTRACT

A process for treating nitrogenous wastewater contains an autotrophic denitrification reaction, a heterotrophic denitrification reaction and a COD removal reaction simultaneously and mixedly taking place in a single reactor. The nitrification reaction is caused by nitrifying bacteria, in which ammonium is oxidized into nitrite. The autotrophic denitrification reaction is caused by autotrophic denitrifying bacteria, in which ammonium used as electron donor and nitrite used as electron acceptor are converted into nitrogen gas and nitrate. The heterotrophic denitrification reaction is caused by heterotrophic denitrifying bacteria, in which nitrate and COD are consumed. It is not necessary to build two separate reactors for aerobic nitrification and anaerobic denitrification, thereby effectively reducing the fabrication and operation cost.

5 Claims, 2 Drawing Sheets

PROCESS FOR TREATING NITROGENOUS WASTEWATER WITH SIMULTANEOUS AUTOTROPHIC DENITRIFICATION, HETERTROPHIC DENITRIFICATION AND COD REMOVAL

BACKGROUND OF THE INVENTION

1. Field of the Invention

The present invention relates to a process for treating nitrogenous wastewater and more specifically, to a process for treating nitrogenous wastewater with simultaneous nitrification, autotrophic denitrification, heterotrophic denitrification and COD (chemical oxygen demand) removal.

2. Description of the Related Art

Wastewaters, for example domestic wastewater, livestock wastewater, landfill leachate and industrial water, contain high concentration organic nitrogen compounds and ammonium. In general, organic nitrogen compounds further decomposes to ammonium. Conventional biological processes for treating nitrogenous wastewater shown as FIG. 1 consist of two reaction steps. The first step is aerobic nitrification, in which the ammonium nitrogen is oxidized by chemolithotrophic bacteria into nitrite and further into nitrate, and oxygen is supplied as electron acceptor. In this step, oxygen is compressed and dissolved into the liquid, which consumes a lot of energy and cost. The second step is anaerobic denitrification, in which the nitrate is converted into gaseous nitrogen by heterotrophic microorganism under the metabolism utilizing an organic substance as carbon source. However, wastewater usually lacks sufficient carbon source for the denitrification reaction, resulting in that operators must add extra carbon source to the reactor, thereby increasing the operation cost. Additionally, the enormous sludge yielded by the heterotrophic bacteria takes much effort to dispose of. Aerobic nitrification and anaerobic denitrification processes involving two different reaction conditions need respective reactors, which increase the fabrication cost.

An improved method for treating nitrogenous wastewater, anaerobic ammonium oxidation (ANAMMOX), is also developed. As disclosed in U.S. Pat. No. 5,078,884, the ANAMMOX process under anaerobic condition is caused by autotrophic denitrifying bacteria capable of using ammonium as electron donor, using nitrite as electron acceptor, and directly producing nitrogen gas. Additionally, if nitrite is not sufficient to supply for the autotrophic denitrification, ammonium is designed to be partially nitrified into nitrite first, and then proceeds the ANAMMOX process with the remaining ammonium. Since nitrification is an aerobic reaction and ANAMMOX process is an anaerobic process, two respective reactors are also necessary to implement nitrification and ANAMMOX processes, which also increase the costs of maintenance and fabrication. Besides, the ANAMMOX process is not able to remove COD from the wastewater.

SUMMARY OF THE INVENTION

The present invention has been accomplished in view of the above-noted circumstances. It is one objective of the present invention to provide a process for treating nitrogenous wastewater, in which a nitrification reaction, a autotrophic denitrification reaction, a heterotrophic denitrification reaction and a COD removal reaction simultaneously and mixedly take place in a single reactor, thereby reducing the fabrication and operation cost.

To achieve this objective of the present invention, the process for treating nitrogenous wastewater comprises the steps of: providing a reactor with liquid for a variety of microorganisms to mixedly grow therein and introducing the nitrogenous wastewater into the reactor and discharging effluent from the reactor. A nitrification reaction, an autotrophic denitrification reaction, a heterotrophic denitrification reaction and a COD removal reaction simultaneously and mixedly take place in the single reactor. The microorganisms contain nitrifying bacteria, autotrophic denitrifying bacteria and heterotrophic denitrifying bacteria. The nitrification reaction is caused by the nitrifying bacteria, in which ammonium is oxidized into nitrite. The autotrophic denitrification reaction is caused by the autotrophic denitrifying bacteria, in which ammonium used as electron donor and nitrite used as electron acceptor are converted into nitrogen gas and nitrate. The heterotrophic denitrification reaction is caused by the heterotrophic denitrifying bacteria, in which nitrate and COD are consumed.

In an embodiment of the present invention, the process comprises a step of introducing oxygen to the liquid of the reactor for nitrification reaction. Further, the microorganisms are suspended uniformly in the liquid of the reactor. The autotrophic denitrifying bacteria causing the autotrophic denitrification reaction is deposited to the Korean Collection for Type Cultures (KCTC) under Deposit No. KCTC 11551 BP. The dissolved oxygen concentration in the reactor is maintained between 0.1-0.5 mg/L.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings which are given by way of illustration only, and thus are not limitative of the present invention, and wherein.

DETAILED DESCRIPTION OF THE INVENTION

Figure 1:
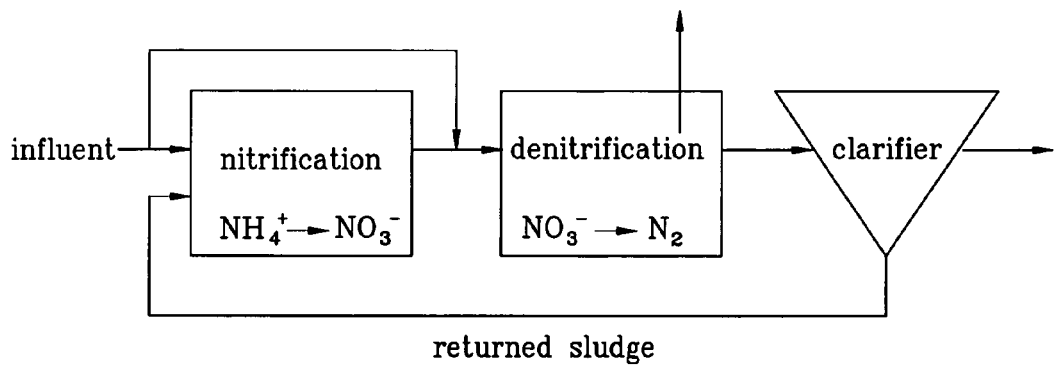
FIG. 1 is a flow chart of conventional biological process for treating nitrogenous wastewater in accordance with the prior art.

This invention provides a method for treating wastewater involving nitrifying bacteria, autotrophic denitrifying bacteria and heterotrophic denitrifying bacteria. The nitrifying bacteria and the heterotrophic denitrifying bacteria are generally used in the conventional wastewater treatment plant, which are easily available. The autotrophic denitrifying bacteria also exist in the activated sludge of the wastewater treatment plant and in the water in nature, but are quantitatively insufficient for commercial use. The inventors seeded the reactor of a wastewater treatment plant with activated sludge for the microorganisms to propagate therein. In the cultivation process, high concentration nitrogenous wastewater and oxygen are introduced into the reactor. A nitrification reaction caused by the nitrifying bacteria, in which the ammonium is oxidized into nitrite, takes place in the reactor. Besides providing electron acceptor for the nitrification reaction, the air is also helpful to stir the wastewater with the biomass. The dissolved oxygen concentration is maintained between 0.1-0.5 mg/L, more preferably 0.2-0.3 mg/L. Under low dissolved oxygen condition, ammonium is only oxidized into nitrite, unable to be converted into nitrate, resulting in the liquid containing sufficient ammonium and nitrite. It is suitable for the autotrophic denitrifying bacteria metabolism. After 3-4 months, the autotrophic denitrifying bacteria are cultivated. The bacteria identified by molecular biotechnology is named Candidatus "*Kuenenia stuttgartiensis*", and deposited to the Korean Collection for Type Cultures under Deposit No. KCTC 11551 BP. Under anaerobic condition, the autotrophic denitrifying bacteria are capable of reacting ammonium as the electron donor with nitrite as the electron acceptor to form nitrogen gas and nitrate. The optimum growth temperature for the autotrophic denitrifying bacteria is 35° C.

The process for treating nitrogenous wastewater of the present invention comprises the steps of: providing a reactor with liquid for a variety of microorganisms to mixedly grow therein, introducing oxygen to the liquid of the reactor, and introducing the nitrogenous wastewater into the reactor and discharging effluent from the reactor.

A nitrification reaction, an autotrophic denitrification reaction, a heterotrophic denitrification reaction and a COD removal reaction simultaneously and mixedly take place in the reactor. The microorganisms suspended in the liquid of the reactor contain nitrifying bacteria, autotrophic denitrifying bacteria and heterotrophic denitrifying bacteria. The nitrification reaction is caused by the nitrifying bacteria, in which ammonium is oxidized into nitrite. The autotrophic denitrification reaction is caused by the autotrophic denitrifying bacteria, in which ammonium used as electron donor and nitrite used as electron acceptor are converted into nitrogen gas and nitrate. The heterotrophic denitrification reaction is caused by the heterotrophic denitrifying bacteria, in which nitrate and COD are consumed.

The dissolved oxygen concentration being lower than 0.5 mg/L seems to be insufficient for the nitrification reaction. However, the high concentration ammonium effectively promotes the proceeding of the autotrophic denitrification reaction, resulting in that nitrite is consumed immediately and maintained in a low concentration level. Due to the shortage of nitrite, the nitrification reaction is still possible to take place.

The microorganisms, including nitrifying bacteria and autotrophic denitrifying bacteria and heterotrophic nitrifying bacteria, are suspended in the reactor which could be a sequencing batch reactor (SBR) or a continuous stirred tank reactor (CSTR).

To illustrate the characters of the invention, three cases are listed as below, but it doesn't mean that the invention limited as the illustration.

Example 1

Figure 2:
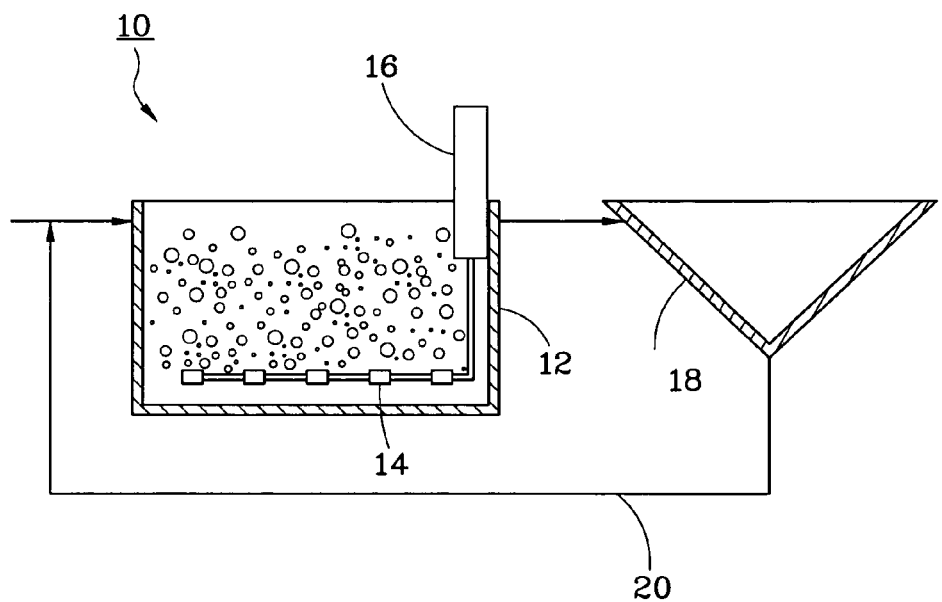
FIG. 2 is a schematic drawing showing a reactor in accordance with the embodiment of the present invention.

As showed in FIG. 2, the reactor 10 provided for the process of treating nitrogenous wastewater in accordance with a preferred embodiment of the present invention is a continuous stirred tank reactor (CSTR), which has a tank 12 with liquid, a variety of microorganisms, a plurality of aeration plates 14, an air compressor 16 and a clarifier 18. The microorganisms containing nitrifying bacteria and autotrophic denitrifying bacteria and heterotrophic denitrifying bacteria are mixedly suspended in the tank 12. The aeration plates 14 are installed in the bottom of the tank 12. Air compressor 16 is connected with the aeration plates 14 for supplying air to increase the dissolved oxygen in the tank 12. The air compressor and aeration plates provide enough oxygen for nitrification and for mixing. The clarifier 18 is connected with the tank 12.

Figure 3:
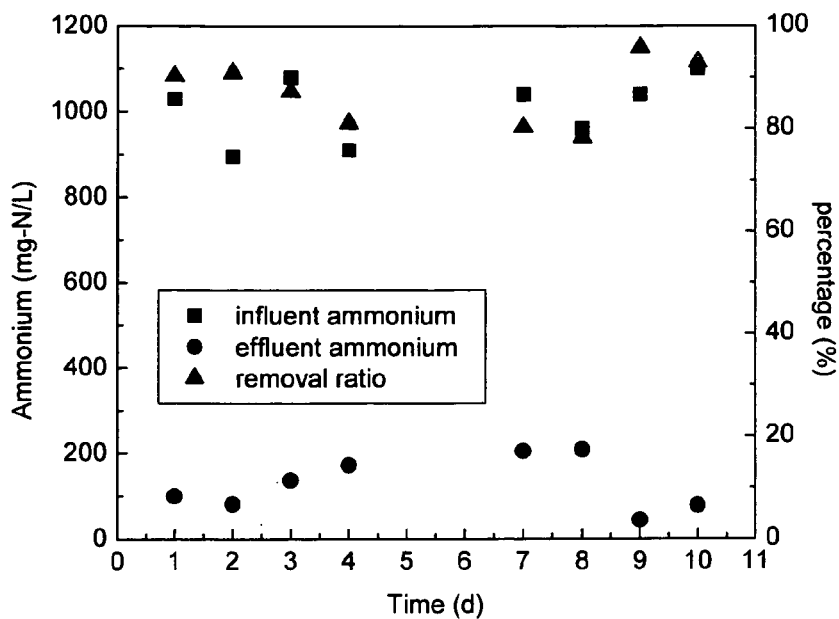
FIG. 3 is a diagram of the ammonium influent concentration, ammonium effluent concentration, and removal ratio in accordance with the embodiment of the present invention.
Figure 4:
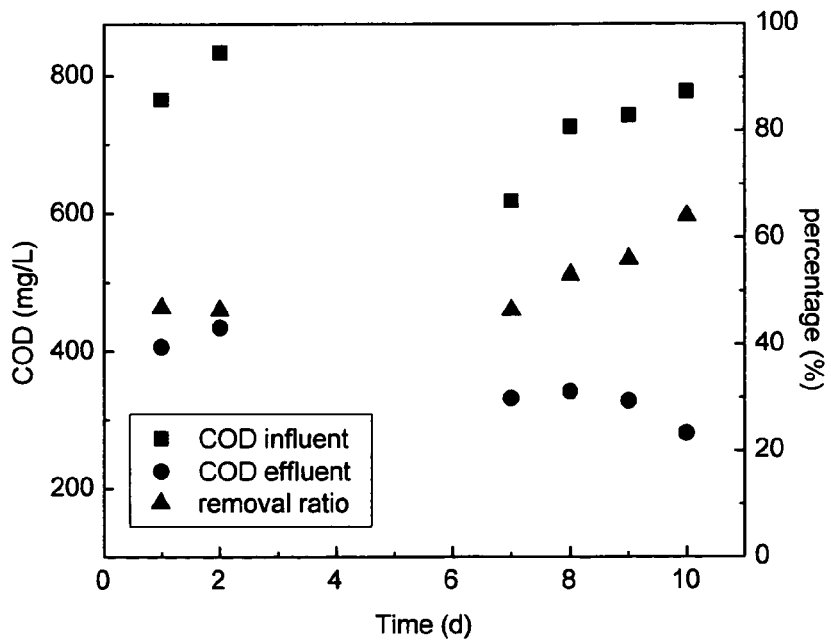
FIG. 4 is a diagram of the COD influent concentration, COD effluent concentration, and removal ratio of in accordance with the embodiment of the present invention.

The nitrogenous wastewater is introduced into the tank 12 and then decanted to the clarifier 18 to settle down suspended solid. The effluent from the clarifier 18 is discharged to the outside environment, and a part of the bottom sludge of the clarifier 18 returns to the tank 12 through a recirculation pipe 20. The hydraulic retention time (HRT) and sludge retention time (SRT) of the system are 1 day and 18 days, respectively. The concentration of dissolved oxygen is 0.2-0.3 mg/L in the reactor. The effluent characteristics and removal efficiency are showed in FIG. 3 and FIG. 4. The ammonium concentration of influent and effluent are between 900-1100 and 44-208 mg-N/L, respectively (FIG. 3). The removal efficiency of COD is 46-63% (FIG. 4). The results show this process is capable of removing ammonium and COD at the same time.

Example 2

A continuous stirred tank reactor (CSTR) is also used. The hydraulic retention time (HRT) and sludge retention time (SRT) of the CSTR are 1 day and 18 days, respectively. The concentration of dissolved oxygen is 0.2-0.3 mg/L in the reactor. The influent and effluent characteristics are showed as below:

|  | Influent | Effluent |
|---|---|---|
| $NH_4^+$ (mg-N/L) | 850 | 293 |
| $NO_2^-$ (mg-N/L) | 0 | 75 |
| $NO_3^-$ (mg-N/L) | 3 | 66 |
| COD (mg/L) | 656 | 437 |
| Total N (mg-N/L) | 853 | 434 |

The total nitrogen removal by this process is 49.2%, and the heterotrophic denitrification and the autotrophic denitrification contribute 5.0% and 44.2%, respectively. The total COD removal by this process is 33.4%. The heterotrophic denitrifying bacteria consume 30.0% of total influent COD, and other heterotrophic denitrifying bacteria in the reactor consume 3.4% of total influent COD. In the process for treating nitrogenous wastewater, autotrophic denitrifying bacteria are responsible for removal of total nitrogen and reduction of sludge production. Additionally, the process in accordance with the present invention consumes less carbon source than traditional process, resulting in that extra carbon source is not necessary to be added into the reactor.

Example 3

The hydraulic retention time (HRT) and sludge retention time (SRT) of the CSTR are 1 day and 18 days, respectively. The concentration of dissolved oxygen is 0.2-0.3 mg/L in the reactor. The influent and effluent characteristics are showed as below.

|  | Influent | Effluent |
|---|---|---|
| $NH_4^+$ (mg-N/L) | 600 | 168 |
| $NO_2^-$ (mg-N/L) | 0 | 21 |
| $NO_3^-$ (mg-N/L) | 3 | 47 |
| COD (mg/L) | 761 | 435 |
| Total N (mg-N/L) | 603 | 236 |

The total nitrogen (TN) removal of this process is 60.9% and the autotrophic denitrification contributes 54.7% TN removal. The ratio of COD removal by heterotrophic denitrifying bacteria and other heterotrophic bacteria are 19.7% and 23.2%, respectively.

The process for treating nitrogenous wastewater in accordance with the present invention contains simultaneous nitrification, autotrophic denitrification and heterotrophic denitrification. Those reactions are able to simultaneously and mixedly take place take place in the single reactor. It is not necessary to build two separate reactors for aerobic nitrification and anaerobic denitrification, thereby effectively reducing the fabrication and operation cost.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A process for treating nitrogenous wastewater, comprising the steps of:
   providing a reactor with liquid for a variety of microorganisms to mixedly grow therein; and
   introducing said nitrogenous wastewater into the reactor and discharging effluent from the reactor;
   wherein a nitrification reaction, an autotrophic denitrification reaction, a heterotrophic denitrification reaction and a COD removal reaction simultaneously and mixedly take place in the reactor;
   wherein said microorganisms contain nitrifying bacteria, autotrophic denitrifying bacteria and heterotrophic denitrifying bacteria, the nitrification reaction caused by the nitrifying bacteria in which ammonium is oxidized into nitrite, the autotrophic denitrification reaction caused by the autotrophic denitrifying bacteria in which ammonium used as electron donor and nitrite used as electron acceptor are converted into nitrogen gas and nitrate, the heterotrophic denitrification reaction caused by the heterotrophic denitrifying bacteria in which nitrate and COD are consumed;
   wherein the autotrophic denitrifying bacteria causing the autotrophic denitrification reaction is deposited to the Korean Collection for Type Cultures under Deposit No. KCTC 11551BP;
   wherein nitrifying bacteria, autotrophic denitrifying bacteria and heterotrophic denitrifying bacteria uniformly grow in the reactor, and the nitrification reaction, the autotrophic denitrification reaction, the heterotrophic denitrification reaction and the COD removal reaction also uniformly take place.

2. The process for treating nitrogenous wastewater as claimed in claim 1, wherein the microorganisms are suspended in the liquid of the reactor.

3. The process for treating nitrogenous wastewater as claimed in claim 1, further comprising a step of introducing oxygen to the liquid of the reactor for nitrification reaction.

4. The process for treating nitrogenous wastewater as claimed in claim 1, wherein the dissolved oxygen concentration in the reactor is maintained between 0.1-0.5 mg/L.

5. The process for treating nitrogenous wastewater as claimed in claim 1, wherein oxygen is supplied to an area where the autotrophic denitrification reaction takes place.

* * * * *